US005551767A

United States Patent [19]

Linkner, Jr.

[11] Patent Number: 5,551,767

[45] Date of Patent: Sep. 3, 1996

[54] COMBINATION HIGH PRESSURE PUMP/ATTENUATOR FOR VEHICLE CONTROL SYSTEMS

[75] Inventor: Herbert L. Linkner, Jr., Dexter, Mich.

[73] Assignee: Kelsey Hayes, Livonia, Mich.

[21] Appl. No.: 394,693

[22] Filed: Feb. 24, 1995

Related U.S. Application Data

[63] Continuation-in-part of Ser. No. 163,658, Dec. 7, 1993.

[51] Int. Cl.⁶ .......... F16L 55/04

[52] U.S. Cl. .......... 303/87; 138/30; 303/116.1; 417/540

[58] Field of Search .......... 303/87, 116.1, 303/116.4, 116.3, 119.1, 116.2, 115.1, 115.4, 115.5, 115.6, 113.1, 113.2, 113.3, 68–69, 900, 901, 10–11; 417/540, 542; 138/30, 31; 60/413; 181/289, 226, 233; 192/109 F

[56] References Cited

U.S. PATENT DOCUMENTS

| | | | |
|---|---|---|---|
| 3,757,825 | 9/1973 | Givens et al. . | |
| 4,453,782 | 6/1984 | Arikawa et al. . | |
| 4,571,009 | 2/1986 | Jones . | |
| 4,828,335 | 5/1989 | Fuller et al. . | |
| 4,997,009 | 3/1991 | Niikura et al. | 138/31 |
| 5,009,581 | 4/1991 | Kushiyama et al. | 303/87 |
| 5,066,075 | 11/1991 | Kaneda et al. . | |
| 5,094,599 | 3/1992 | Budecker | 303/87 |
| 5,096,400 | 3/1992 | Budecker et al. . | |
| 5,127,712 | 7/1992 | Rizk et al. | 303/87 |
| 5,143,428 | 9/1992 | Toda et al. . | |
| 5,205,326 | 4/1993 | Paley et al. | 417/540 |
| 5,207,567 | 5/1993 | Joy | 417/540 |
| 5,209,553 | 5/1993 | Burgdorf et al. | 303/87 |
| 5,209,554 | 5/1993 | Beilfuss et al. . | |
| 5,213,482 | 5/1993 | Reinartz et al. | 417/540 |
| 5,232,273 | 8/1993 | Eckstein et al. . | |
| 5,236,253 | 8/1993 | Glasmacher | 303/87 |
| 5,244,262 | 9/1993 | Kehl et al. . | |
| 5,271,667 | 12/1993 | Takata et al. . | |
| 5,290,098 | 3/1994 | Burgdorf et al. | 303/113.2 |
| 5,312,174 | 5/1994 | Beilfuss et al. . | |
| 5,354,187 | 10/1994 | Holland et al. | 417/540 |

FOREIGN PATENT DOCUMENTS

| | | | |
|---|---|---|---|
| 0491159A1 | 11/1991 | European Pat. Off. . | |
| 1373140 | 12/1964 | France . | |
| 1963709 | 7/1971 | Germany . | |
| 4029846 | 4/1991 | Germany . | |
| 4002635 | 8/1991 | Germany . | |
| 4128386 | 3/1993 | Germany . | |
| 59-32549 | 2/1984 | Japan | 303/116.4 |
| 61-211154 | 9/1986 | Japan | 303/116.4 |
| 1106759 | 4/1989 | Japan . | |
| 9011212 | 10/1990 | WIPO | 303/116.4 |
| 9314960 | 8/1993 | WIPO | 303/116.4 |

OTHER PUBLICATIONS

Fluid Technology–Accumulators, pp. 360 and 361 (undated).

*Primary Examiner*—Douglas C. Butler
*Attorney, Agent, or Firm*—Brooks & Kushman P.C.

[57] ABSTRACT

A combination high pressure pump/attenuator suitable for use in vehicle control systems employs a high pressure pump outlet check valve located in the attenuator cavity and compressively loaded against its seat by the compressive force of a volumetrically and axially compressible attenuator element. In one preferred embodiment, the check ball is replaced by a projection molded into the attenuating element itself.

17 Claims, 2 Drawing Sheets

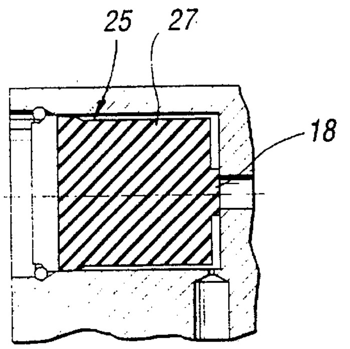
Fig. 3a
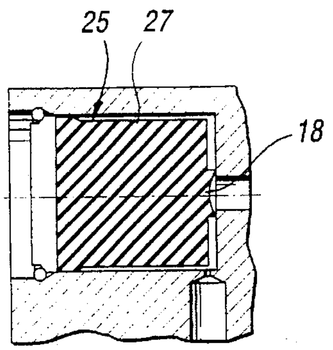
Fig. 3b
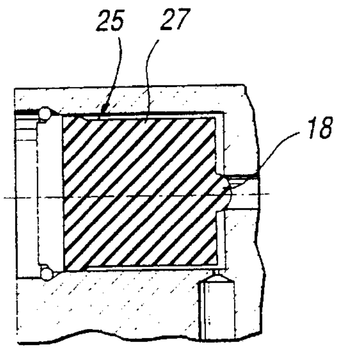
Fig. 3c
Fig. 4
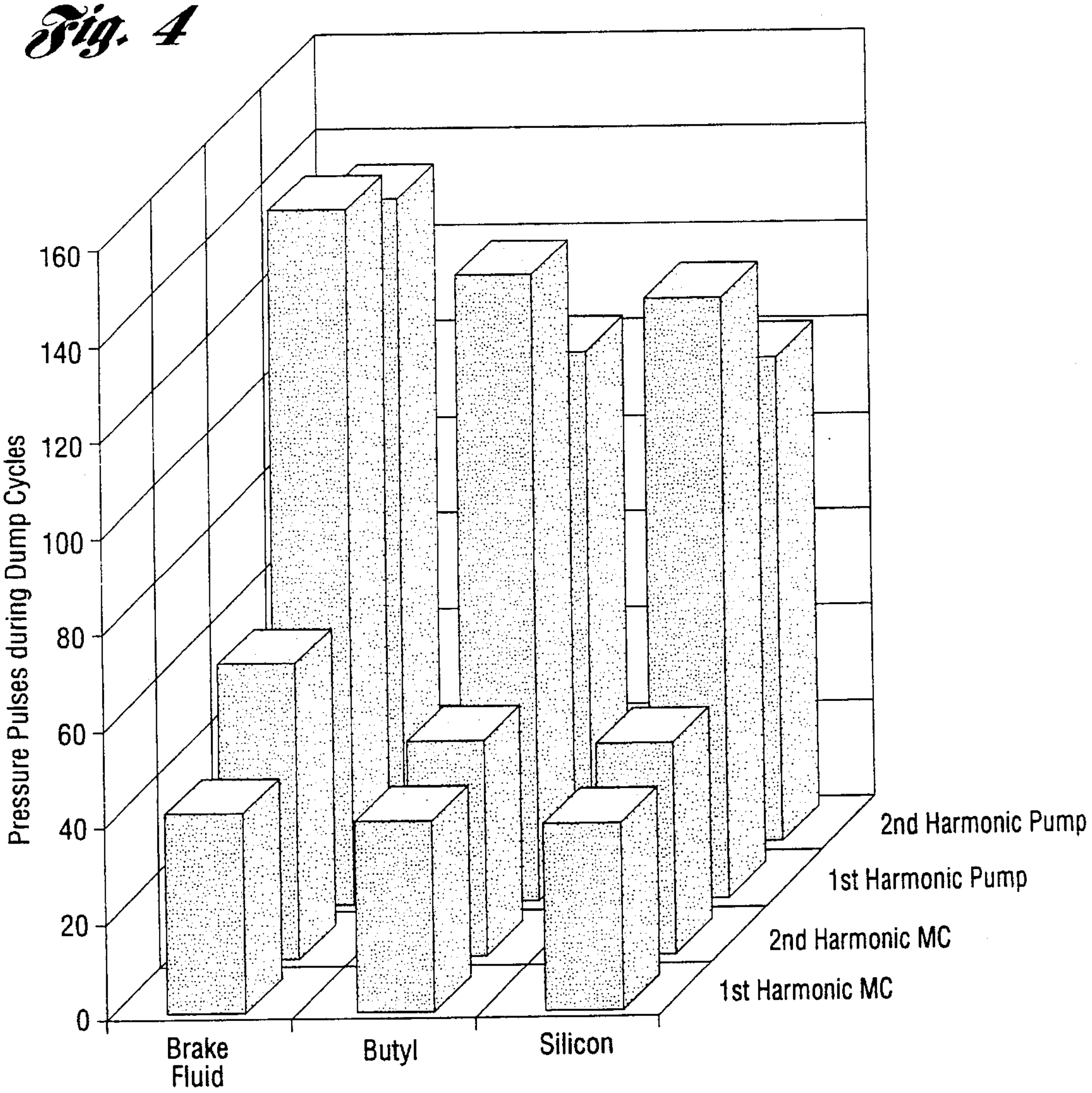

COMBINATION HIGH PRESSURE PUMP/ATTENUATOR FOR VEHICLE CONTROL SYSTEMS

CROSS-REFERENCE TO RELATED APPLICATION

This application is a continuation-in-part of my U.S. patent application Ser. No. 08/163,658, filed Dec. 7, 1993, which is assigned to the assignee of the present application and which is hereby incorporated by reference.

TECHNICAL FIELD

The present invention pertains to vehicle control systems, particularly those suitable for use in anti-lock braking systems and traction control systems. More particularly, the subject invention pertains to a combination high pressure pump/attenuator for vehicle control systems with smaller size and reduced part count and concomitant ease of assembly.

BACKGROUND ART

Anti-lock braking systems have now progressed to the point where they are standard on many vehicles. The use of traction control systems is now becoming increasingly widespread, and it is anticipated that their use would parallel that of anti-lock braking systems. In both systems, which may be termed "vehicle control systems," rapid deployment of brake calipers or brake shoes are necessary in order to perform the intended control function. In anti-lock braking systems, when locking of the wheels due to over-application of brake pressure or loss of traction due to the nature of the surface, i.e., gravel, ice, or snow, is encountered, the automotive braking system rapidly pulsates the brakes between an off and an on condition, allowing maximal retention of braking ability while yet retaining the ability to steer the vehicle in a stable fashion. In traction control systems, loss of traction in a driving wheel is countered by a momentary application of brake pressure, thus restoring traction. In either case, high pressure systems are desirable to affect the rapid changes necessary to achieve the desired control.

During anti-lock operation, it is necessary to rapidly decrease brake pressure by pumping brake fluid from the brake cylinders back to the master cylinder. This is necessary both for decreasing brake pressures and for having this dumped fluid available for subsequent antilock cycles in a stop. The motor driven high pressure pump is actuated only when the need for high pressure brake releases is sensed by the circuitry associated with anti-lock braking system or traction control system, as the case may be.

A typical anti-lock braking system is shown schematically in the above-referenced related patent application. In that system, hydraulic fluid from the brake pedal actuated master cylinder flows through a line through a normally open isolation solenoid valve to a brake caliper slave cylinder. Except for the presence of the additional normally open isolation valve, the system thus far described is similar to the normal braking system of the automobile. In an anti-lock brake system, detection of a lock condition actuates a high pressure pump and closes the solenoid actuated isolation valve. At the same time, a solenoid actuated hold/dump valve is opened, allowing pressure to bleed from the brake cylinder to the low pressure accumulator. The brakes are thus momentarily released. The low pressure accumulator allows quick initial dumping or decrease in brake pressure. The pump, however, empties the low pressure accumulator to allow continued decrease of brake pressure if needed and also pumps the brake fluid back to the master cylinder for subsequent needed antilock cycles of a stop. To reapply the brakes, pressure from either/or the master cylinder or the high pressure pump is diverted to the brake cylinder by opening the isolation valve and closing the hold/dump valve, once again increasing braking pressure. This cycle repeats itself rapidly as needed, resulting in rapid increases or decreases of brake pressure thus achieving maximal braking while avoiding a locked condition. Although this system is highly effective, it may be subject to noise and vibration due to the high pressure pulses emanating from the high pressure pump, as well as the pressure spikes and rebound pulses emanating from the isolation solenoid and the dump valves. In order to minimize these effects, it has proven useful to place an attenuator on the outlet side of the pump between the pump outlet and master cylinder. The combination of the compressible hydraulic fluid or elastomer within the attenuator cavity and a reduced diameter orifice adjacent thereto in the line leading therefrom, attenuates the pressure pulses and vibrations emanating from the pump.

Commonly used hydraulic systems in anti-lock and traction control systems utilize split or divided systems in which one portion of an opposed, dual piston pump supplies hydraulic fluid to two of the vehicle wheels, while the other piston of the high pressure pump supplies high pressure hydraulic fluid similarly to the other half of the braking system, i.e., the other two wheels. The braking circuit to each wheel is generally as described above, with the addition of integrated traction control requiring basically additional control valves and a high pressure accumulator associated with the hydraulic circuits in that portion of the system.

The various control valves, generally solenoid actuated valves, and the attenuators, low pressure accumulators, high pressure accumulators, if any, and high pressure pump elements are all commonly assembled in a single housing of extruded aluminum into which the various components are located in appropriately machined bores. Additional internal bores provide the requisite hydraulic circuit interconnections. Even though the body or housing of the hydraulic control unit is made of light alloy material, its size, and the size of the components located therein, many of whose parts are constructed of steel, still represent a significant amount of weight in a vehicle. Significant weight savings can be accomplished by reducing the overall size of the control unit, and additional savings can be effected by reducing the weight of the component parts of the various accumulators, attenuators, solenoids, and high pressure pump components.

In addition to the desirability of effecting weight savings by reduction of size and number of components, it is further desirable to reduce manufacturing costs by both reducing the number of components as well as aiding in ease of assembly of the components.

SUMMARY OF THE INVENTION

The present invention pertains to a combination high pressure pump/attenuator useful in vehicle control systems.

More particularly, the present invention pertains to a combination high pressure pump/attenuator wherein the outlet check ball of the high pressure pump is moved to and incorporated in the attenuator, thus both reducing part count and increasing ease of assembly of the high pressure pump assembly. Due to the revision of the location of the outlet check ball, the length of the hydraulic control unit as measured through the axis of the pump pistons is reduced by a total of approximately 16 mm, a substantial decrease in size, thereby resulting in an approximate 16% decrease in pump element length and allowing a weight reduction of about 15% and a volume reduction of about 15%.

Further, unlike conventional pump outlet check valves which have helical metal springs, the outlet check ball of this invention, whether it is a separate ball or an integral molded elastomer ball, is preloaded by the compressive elastic force of the elastomeric attenuator element itself. All the attenuator element materials recommended herein have a beneficial hysteresis that damps check ball rebound and effectively eliminates check ball bouncing which can be a source of noise in antilock systems and in piston pump systems.

The subject invention further pertains to a combination high pressure pump for use in vehicle control systems comprising a reciprocable piston member sealingly engaged in a bore, and providing a high pressure fluid pump cavity; a pump inlet passage capable of supplying fluid to the high pressure fluid cavity; an attenuator containing an elastomeric attenuating element positioned in an attenuator cavity and having an outlet orifice; an attenuator inlet passage connecting the attenuator cavity with the pump cavity, the diameter of the inlet passage being larger than the diameter of the outlet orifice; and a check valve located within the attenuator cavity adapted to allow one way passage of high pressure fluid from the high pressure pump to the attenuator.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIGS. 3*a*, 3*b*, and 3*c* illustrate alternative embodiments of the attenuator which function without the use of a separate check ball; and FIG. 4 illustrates the improvement in pressure fluctuation by attenuators of different materials and constructed in accordance with the subject invention, as compared to a brake fluid filled attenuator.

BEST MODE FOR CARRYING OUT THE INVENTION

Figure 1:
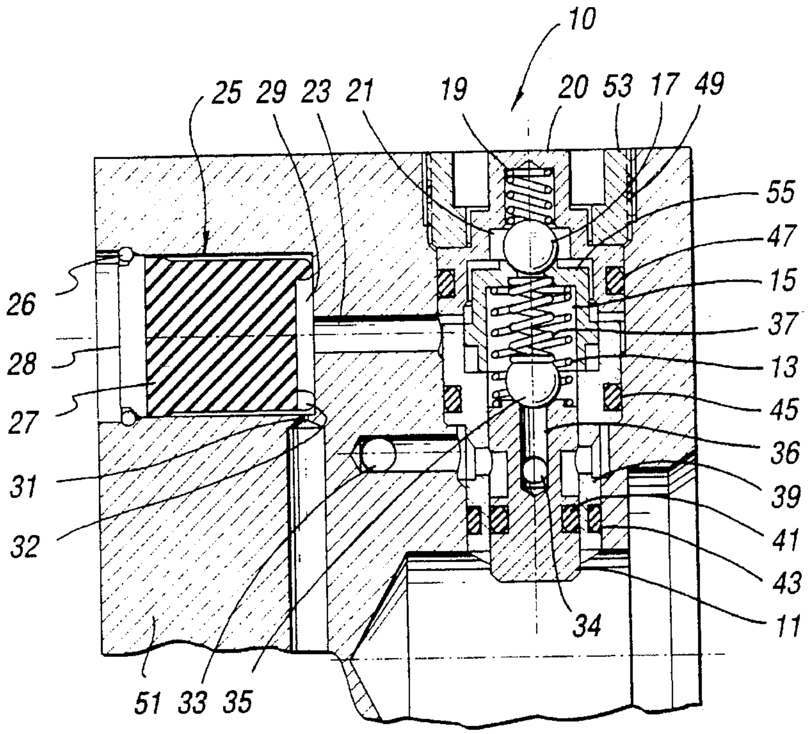
FIG. 1 illustrates a high pressure pump assembly utilized in conjunction with a solid core volumetrically compressible attenuator as described in my pending U.S. application Ser. No. 08/163,658, incorporated herein by reference.

In FIG. 1, as concerns the pump piston assembly, generally designated 10, pump piston 11 is urged outwardly by piston return spring 13 against an electric motor-driven eccentric (not shown). Upon being driven inwardly by the eccentric, high pressure fluid in fluid reservoir 15 exits through outlet check ball 17 which is urged against its seat by check ball spring 19, both located in sleeve 20. High pressure fluid exits via passages 21 through bore 23 to volumetrically compressible attenuator, generally designated 25. The attenuator comprises an elastomeric or other volumetrically compressible member 27 residing in cavity 29, and bonded to a cap 28 which is held in place by a snap ring 26. High pressure fluid pulses cause elastomeric member 27 to be volumetrically compressed. The volumetric compression of this member, which is a function of its bulk modulus, together with the energy dissipating and damping characteristics of the reduced diameter exit orifice 31 causes high pressure pulses and their harmonics to be attenuated as the fluid passes from cavity 29 through one or more radially extending grooves 32 in the annular lip of the member 27 to orifice 31.

During the return stroke of piston 11 against the rotating eccentric, facilitated by return spring 13, the outlet check valve 17 closes and fluid from the low pressure accumulator (not shown) on the inlet side of the pump, may enter the pump cavity through port 33 and through radially connecting passage 34 in the piston, through inlet bore 36 and past inlet check ball 35 which is only lightly urged against its seat by inlet check ball spring 37. The piston is sealed against sleeve 39 by dynamic seal 41, shown here schematically as an O-ring. At 43, 45 and 47, are additional sealing O-rings necessary to seal the sleeves 20 and 39 with respect to the light alloy control unit housing 51, and at 49 is an additional seal to seal threaded retainer sleeve 53 to the housing. Sleeve 20 includes radial grooves at the end abutting sleeve 39 to provide fluid communication from outlet passage 21 to attenuator inlet bore 23. Sleeve 55 forms the high pressure fluid pump cavity.

Figure 2:
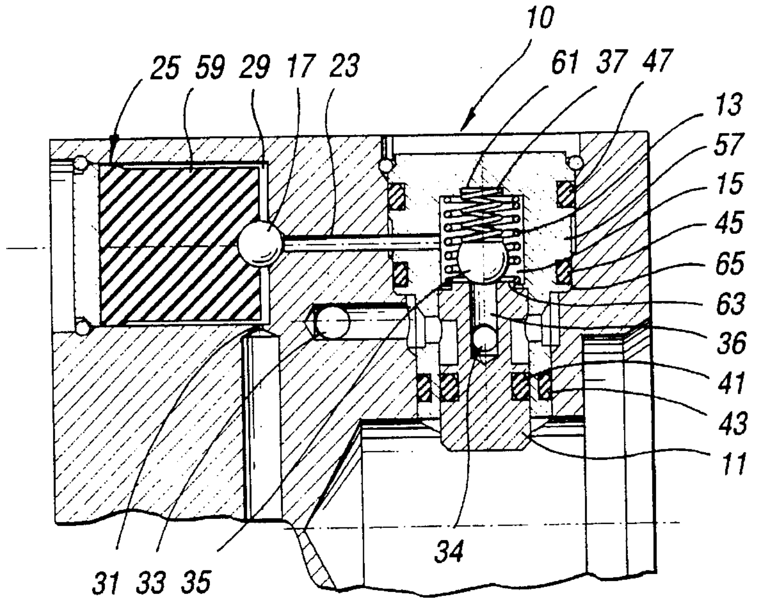
FIG. 2 illustrates one embodiment of the subject invention combination high pressure pump/attenuator in which the outlet check ball is located in the attenuator.

FIG. 2 illustrates one embodiment of the present invention. In FIG. 2, the four sleeves of the pump, inclusive of the retainer, have been replaced with but a single sleeve. Like elements are numbered as in FIG. 1, and perform like functions. Sleeve 57 replaces sleeves 20, 39, 53 and 55, and no longer carries an outlet check valve assembly. In operation, the outwardly moving piston on the pump stroke forces high pressure fluid through bore 23, lifting outlet check valve 17, compression loaded by the volumetrically compressible and resilient attenuator element 59 against its seat, and flows into attenuator cavity 29 as substantial portion of the side area of the resilient attenuator element 59 as well as the area of one of its two ends being exposed to the fluid. The high pressure pulses are partially absorbed by the volumetric compressibility of attenuator element 59 and damped by energy dissipative reduced diameter orifice 31. Further details on the specifics of the volumetrically compressible attenuator per se, e.g. without check ball 17, are disclosed in copending application Ser. No. 08/163,658, as referenced earlier.

As a result of the relocation of the outlet check ball to the attenuator, the number of machined sleeves has been reduced from four to one, with retention of the device in the housing made possible by means described earlier in regard to FIG. 1. In addition, three sealing O-rings 43, 45, 47 are required instead of four, and the outlet check ball spring has been eliminated.

Also, the length of the hydraulic control unit as measured through the axis of the pump piston has been reduced considerably. For example, comparing FIG. 1 to FIG. 2, the axial length taken up by the check ball 17, spring 19, and end cap or sleeve 20 has been eliminated. The length of piston 11, pump chamber or reservoir 15, and enclosing sleeve 55, 57 virtually remain the same. Thus, the overall reduction in axial length is on the order of 16%, with a near equal reduction in volume and weight of the entire hydraulic control unit.

The outermost end of the movable piston member 11 bears against a conventional piston driving means as described earlier.

As a matter of further detail, it will be noted that the return spring 13 and the inlet check valve spring 37 are concentrically nested, one within the other, with innermost spring 37 being seated within a pocket 61 in sleeve 57 and spring 13 being seated on a collar 63 at the end of piston 11. The cylindrical pump chamber 15 is sized to closely receive spring 13 to preclude spring misalignment, as is well known to those skilled in the art. Sleeve 13 includes a stop shoulder 65 locating the pump assembly 10 fixed relative to the housing against a corresponding annular seat formed within the housing piston bore.

Check ball 17 may advantageously be made of material such as nylon or other thermoplastic, thus further reducing noise and vibration which would otherwise occur when a steel or ceramic ball hits its seat. Moreover, the separate check ball itself may be eliminated, thus further reducing part count and assembly time, by molding the check ball as a protrusion of the elastomeric attenuator element. Three embodiments of such a combination elastomeric attenuator element/check device are shown in FIGS. 3*a*, 3*b*, and 3*c*, with the projecting check valve portion of the compressible attenuator member 27 being identified as 18.

In operation, the combination high pressure pump/attenuator with revised check ball location serves to attenuate and damp not only the high pressure pulses, vibrations, and harmonics at the output of the attenuator, i.e., the master cylinder line, but also attenuate and damp high pressure pulses at the pump cavity itself, thus reducing noise causing shocks and vibrations on the pump bearing and motor.

FIG. 4 illustrates a bar graph showing the pressure pulses which occur during dump cycles. The first set of bars, those closest to the pressure axis, show, from front to back, the first and second harmonics at the master cylinder and the first and second harmonics at the high pressure pump as are produced in a standard hydraulic fluid filled attenuator. The second and third sets of bars illustrate the improvement in lowering pressure pulses using elastomeric attenuator members of 40 durometer butyl rubber and 45 durometer silicone rubber, respectively. These materials have a bulk modulus (i.e. a volumetric compressibility) of 325,000 and 192,000 psi, respectively. My invention, as it pertains generally to the attenuator has been found to work best in vehicle ABS systems where the bulk modulus is selected from a range of about 350,000 psi to as low as possible. The upper limit is approximately equal to the bulk modulus of the brake fluid in the system. The most practical lower limit to date based on available materials is about 290,000 psi. Silicone rubber, while compatible with some brake fluids, and having a desireable lower bulk modulus of about 190,000 psi, would be considered incompatible with a silicone based brake fluid.

Having now fully described the invention, it will be apparent to one of ordinary skill in the art that many changes and modifications can be made thereto without departing from the spirit or scope of the invention as set forth herein.

What is claimed is:

1. In combination, a hydraulic control unit housing suitable for use in vehicle control systems and including a high pressure pump piston assembly at an outlet side of said pump piston assembly;

said pump piston assembly comprising a reciprocable piston member sealingly engaged in a bore of said housing, and providing a high pressure fluid pump cavity;

a pump inlet passage connected to said high pressure fluid pump cavity; an attenuator containing a solid, volumetrically compressible, elastomeric attenuating element positioned in and substantially filling an attenuator cavity, the attenuator also having an outlet orifice;

an attenuator inlet passage connecting said attenuator cavity with said pump cavity, the diameter of said inlet passage being larger than the diameter of said outlet orifice; and an outlet check valve located within said attenuator cavity and allowing one way passage of high pressure fluid from said high pressure pump to said attenuator, said outlet check valve being compression loaded against a check valve seat by a force generated by compression of said attenuating element.

2. The combination of claim 1 wherein said outlet check valve is positioned at the point of entry of said attenuator inlet passage into said attenuator cavity, said attenuating element having a side surface area and a surface area at each of two ends thereof, a substantial portion of the side surface area as well as a substantial portion of the area of one end being exposed to the fluid.

3. The combination of claim 2 wherein said outlet check valve is a ball seated partially within said attenuating element, said check ball being compression loaded against said check ball seat by means of a force generated by compression of said attenuating element against said check ball.

4. The combination of claim 2, wherein said attenuating element is a solid elastomeric members said outlet check valve comprising a projection on said elastomeric attenuating element, said projection being compression loaded against said attenuator inlet passage.

5. The combination of claim 2, wherein said reciprocable piston member includes an inlet bore extending axially of said piston member;

at least one radially extending passage in said piston member communicating said inlet bore with said pump inlet passage;

a sleeve member contained in said bore of said body, the inner diameter of said sleeve member slidingly engaging said piston member, said sleeve member being closed at the end most remote from said piston member, said sleeve and said piston member together defining said high pressure fluid pump cavity;

an inlet check valve adapted to seat on an inlet check valve seat positioned at the said piston inlet bore; and an inlet check valve spring urging said check valve against said check valve seat.

6. The combination of claim 5 wherein said inlet check valve means is a ball.

7. The combination of claim 6 wherein said outlet check valve is non-metallic.

8. The combination of claim 7 wherein said outlet check valve is ceramic.

9. The combination of claim 7 wherein said outlet check valve is thermoplastic.

10. The combination of claim 7 wherein said outlet check valve is an elastomer and constitutes an integral portion of said attenuator.

11. In combination, a hydraulic control unit housing suitable for use in vehicle control systems and including a high pressure pump piston assembly in fluid communication with an attenuator assembly at an outlet side of said pump piston assembly;

said pump piston assembly comprising a reciprocable member sealingly engaged in a bore of said housing, and providing a high pressure fluid pump cavity;

a pump inlet passage connected to said high pressure fluid pump cavity;

an attenuator containing an attenuating element positioned in an attenuator cavity and having an outlet orifice, said attenuating element being a solid elastomeric member;

an attenuator inlet passage connecting said attenuator cavity with said pump cavity, the diameter of said inlet passage being larger than the diameter of said outlet orifice; and an outlet check valve located within said attenuator cavity and allowing one way passage of high pressure fluid from said high pressure pump to said attenuator, said outlet check valve comprising a projection on said elastomeric attenuating element, said projection being compression loaded against said attenuator inlet passage at the point of entry of said attenuator inlet passage into said attenuator cavity.

12. In combination, a hydraulic control unit housing suitable for use in vehicle control systems and including a high pressure pump piston assembly in fluid communication with an attenuator assembly at an outlet side of said pump piston assembly;

said pump piston assembly comprising a reciprocable piston member sealingly engaged in a bore of said housing, and providing a high pressure fluid pump cavity;

said reciprocable piston member including an inlet bore extending axially of said piston member;

at least one radially extending passage in said piston member communicating said inlet bore with said pump inlet passage;

a sleeve member contained in said bore of said body, the inner diameter of said sleeve member slidingly engaging said piston member, said sleeve member being closed at the end most remote from said piston member, said sleeve and said piston member together defining said high pressure fluid pump cavity;

an inlet check valve adapted to seat on an inlet check valve seat positioned at the said piston inlet bore; and an inlet check valve spring urging said check valve against said check valve seat;

a pump inlet passage connected to said high pressure fluid pump cavity;

an attenuator containing an attenuating element positioned in an attenuator cavity and having an outlet orifice;

an attenuator inlet passage connecting said attenuator cavity with said pump cavity, the diameter of said inlet passage being larger than the diameter of said outlet orifice; and an outlet check valve located within said attenuator cavity and allowing one way passage of high pressure fluid from said high pressure pump to said attenuator, said outlet check valve being compression loaded against a check valve seat positioned at the point of entry of said attenuator inlet passage into said attenuator cavity.

13. The combination of claim 12 wherein said inlet check valve means is a ball.

14. The combination of claim 13 wherein said outlet check valve is non-metallic.

15. The combination of claim 14 wherein said outlet check valve is ceramic.

16. The combination of claim 14 wherein said outlet check valve is thermoplastic.

17. The combination of claim 14 wherein said outlet check valve is an elastomer and constitutes an integral portion of said attenuator.

* * * * *